United States Patent
Clark et al.

(10) Patent No.: US 12,380,587 B2
(45) Date of Patent: Aug. 5, 2025

(54) METHOD AND APPARATUS FOR VISION-BASED TOOL LOCALIZATION

(71) Applicant: Bright Machines, Inc., San Francisco, CA (US)

(72) Inventors: Barrett Clark, Seattle, WA (US); Oytun Akman, Oakland, CA (US); Matthew Brown, Seattle, WA (US); Ronald Poelman, Wassenaar (NL); Brian Philip Mathews, Burlingame, CA (US); Emmanuel Gallo, Oakland, CA (US); Ali Shafiekhani, San Francisco, CA (US)

(73) Assignee: Bright Machines, Inc., San Francisco, CA (US)

( * ) Notice: Subject to any disclaimer, the term of this patent is extended or adjusted under 35 U.S.C. 154(b) by 258 days.

(21) Appl. No.: 17/812,154

(22) Filed: Jul. 12, 2022

(65) Prior Publication Data

US 2023/0015238 A1    Jan. 19, 2023

Related U.S. Application Data

(60) Provisional application No. 63/203,326, filed on Jul. 16, 2021.

(51) Int. Cl.
    *G06T 7/70* (2017.01)
    *B25J 9/16* (2006.01)
    (Continued)

(52) U.S. Cl.
    CPC .............. *G06T 7/70* (2017.01); *B25J 9/1697* (2013.01); *G06T 1/0014* (2013.01);
    (Continued)

(58) Field of Classification Search
    CPC ......... A61B 34/30; A61B 34/20; A61B 34/10; A61B 34/25; A61B 2034/2065;
    (Continued)

(56) References Cited

U.S. PATENT DOCUMENTS

| | | |
|---|---|---|
| 7,403,835 B2 | 7/2008 | Sandner et al. |
| 7,996,113 B2 | 8/2011 | Yuan et al. |

(Continued)

FOREIGN PATENT DOCUMENTS

| | | |
|---|---|---|
| CN | 106426158 A | 2/2017 |
| CN | 110795874 A | 2/2020 |

(Continued)

OTHER PUBLICATIONS

International Search Report and Written Opinion, PCT App. No. PCT/US2022/073658, Nov. 29, 2022, 13 pages.

(Continued)

*Primary Examiner* — Xiao M Wu
*Assistant Examiner* — Scott E Sonners
(74) *Attorney, Agent, or Firm* — Nicholson De Vos Webster & Elliott LLP; Judith Szepesi

(57) ABSTRACT

A method for vision-based tool localization (VTL) in a robotic assembly system including one or more calibrated cameras, the method comprising capturing a plurality of images of the tool contact area from a plurality of different vantage points, determining an estimated position of the tool contact area based on an image, and refining the estimated position based on another image from another vantage point. The method further comprises providing the refined position to the robotic assembly system to enable accurate control of the tool by the robotic assembly system.

20 Claims, 14 Drawing Sheets

(51) Int. Cl.
| | |
|---|---|
| *G06T 1/00* | (2006.01) |
| *G06T 7/00* | (2017.01) |
| *G06T 7/60* | (2017.01) |
| *G06T 11/20* | (2006.01) |
| *G06T 15/00* | (2011.01) |

(52) U.S. Cl.
CPC .............. *G06T 7/0004* (2013.01); *G06T 7/60* (2013.01); *G06T 11/203* (2013.01); *G06T 15/00* (2013.01); *G05B 2219/37559* (2013.01); *G05B 2219/40589* (2013.01); *G06T 2207/20092* (2013.01); *G06T 2207/30164* (2013.01)

(58) Field of Classification Search
CPC ......... A61B 2034/107; A61B 2090/365; B25J 9/1697; B25J 9/1612; B25J 9/1661; B25J 9/1664; B25J 19/023; B25J 9/1671; G06V 20/20; G06T 19/006; G06T 2207/30004; G06T 2210/41; G06T 2207/10016; G06T 2207/20221; G06T 7/33; G06T 7/70; G06T 15/08; G06T 2207/20212; G06T 2207/30204; G06T 7/73; G06T 7/74; G06T 2207/30196; G06T 2207/30244; G06T 7/174; G06T 7/344; G06T 7/75; G06T 7/80; G06T 1/0014; G06T 15/00; G06T 19/003; G06T 19/20; G06T 2207/20104; G06T 2219/2016; G06T 7/0004; G06T 19/00; G06T 2200/24; G06F 3/011
See application file for complete search history.

(56) References Cited

U.S. PATENT DOCUMENTS

| | | | |
|---|---|---|---|
| 8,346,392 | B2 | 1/2013 | Walser et al. |
| 9,508,148 | B2 | 11/2016 | Zhang et al. |
| 9,643,314 | B2 | 5/2017 | Guerin et al. |
| 9,671,777 | B1 | 6/2017 | Aichele et al. |
| 9,707,680 | B1 | 7/2017 | Jessen et al. |
| 9,796,083 | B2 | 10/2017 | Atohira et al. |
| 9,811,074 | B1 | 11/2017 | Aichele et al. |
| 9,840,007 | B1 | 12/2017 | Kuffner |
| 9,844,882 | B2 | 12/2017 | Takizawa et al. |
| 9,971,914 | B2 | 5/2018 | Maturana et al. |
| 10,279,480 | B1 | 5/2019 | Holson et al. |
| 10,456,915 | B1 | 10/2019 | Diankov |
| 10,475,240 | B2 | 11/2019 | Evans et al. |
| 10,576,635 | B2 | 3/2020 | Ogawa et al. |
| 10,596,700 | B2 | 3/2020 | Corkum et al. |
| 10,773,386 | B2 | 9/2020 | Yamauchi et al. |
| 10,782,668 | B2 | 9/2020 | Bank et al. |
| 10,875,176 | B2 | 12/2020 | Radrich et al. |
| 11,023,934 | B1 | 6/2021 | Jacobs et al. |
| 11,209,798 | B1 | 12/2021 | Michalowski et al. |
| 2006/0107507 | A1 | 5/2006 | Brose et al. |
| 2007/0150100 | A1 | 6/2007 | Saraliev |
| 2008/0013825 | A1 | 1/2008 | Nagatsuka et al. |
| 2009/0118864 | A1 | 5/2009 | Eldridge et al. |
| 2012/0265345 | A1 | 10/2012 | Nakahara |
| 2014/0046635 | A1 | 2/2014 | Kersh et al. |
| 2014/0148949 | A1 | 5/2014 | Graca et al. |
| 2014/0297244 | A1 | 10/2014 | Maturana et al. |
| 2015/0134317 | A1 | 5/2015 | Maturana et al. |
| 2015/0239127 | A1 | 8/2015 | Barajas et al. |
| 2015/0321352 | A1 | 11/2015 | Debain et al. |
| 2016/0239013 | A1 | 8/2016 | Troy et al. |
| 2016/0243704 | A1 | 8/2016 | Vakanski et al. |
| 2017/0079725 | A1 | 3/2017 | Hoffman et al. |
| 2018/0029232 | A1 | 2/2018 | Ouchi et al. |
| 2018/0126553 | A1 | 5/2018 | Corkum et al. |
| 2018/0304467 | A1 | 10/2018 | Matsuura et al. |
| 2018/0315237 | A1 | 11/2018 | Byers et al. |
| 2018/0356895 | A1 | 12/2018 | Dailey et al. |
| 2019/0001573 | A1 | 1/2019 | Gulbrandsen et al. |
| 2019/0015163 | A1* | 1/2019 | Abhari .................. H04N 7/181 |
| 2019/0056928 | A1 | 2/2019 | Smal et al. |
| 2019/0084160 | A1 | 3/2019 | Liu et al. |
| 2019/0254754 | A1* | 8/2019 | Johnson ................ G06T 19/006 |
| 2019/0280405 | A1 | 9/2019 | Iwai et al. |
| 2019/0291277 | A1 | 9/2019 | Oleynik |
| 2019/0308320 | A1 | 10/2019 | Konishi |
| 2019/0339966 | A1 | 11/2019 | Moondhra et al. |
| 2019/0339967 | A1 | 11/2019 | Moondhra et al. |
| 2019/0350685 | A1 | 11/2019 | Saghatchi et al. |
| 2019/0380794 | A1 | 12/2019 | Al et al. |
| 2019/0389060 | A1 | 12/2019 | Roy Chaudhuri et al. |
| 2020/0016758 | A1 | 1/2020 | Keller et al. |
| 2020/0024853 | A1 | 1/2020 | Furrer et al. |
| 2020/0030979 | A1 | 1/2020 | Bank et al. |
| 2020/0078948 | A1 | 3/2020 | Krause et al. |
| 2020/0086483 | A1 | 3/2020 | Li et al. |
| 2020/0147794 | A1 | 5/2020 | Kerrick et al. |
| 2020/0156251 | A1 | 5/2020 | Huang et al. |
| 2020/0159648 | A1 | 5/2020 | Ghare et al. |
| 2020/0171668 | A1 | 6/2020 | Lin et al. |
| 2020/0171671 | A1 | 6/2020 | Huang et al. |
| 2020/0206913 | A1 | 7/2020 | Kaehler |
| 2020/0206919 | A1 | 7/2020 | Nakayama et al. |
| 2020/0225655 | A1 | 7/2020 | Cella et al. |
| 2020/0265329 | A1 | 8/2020 | Thomsen et al. |
| 2020/0276714 | A1 | 9/2020 | Declerck et al. |
| 2020/0301510 | A1 | 9/2020 | Birchfield et al. |
| 2020/0306977 | A1 | 10/2020 | Islam et al. |
| 2020/0310394 | A1 | 10/2020 | Wouhaybi et al. |
| 2020/0342067 | A1 | 10/2020 | Yu et al. |
| 2020/0398435 | A1 | 12/2020 | Okura et al. |
| 2021/0018903 | A1 | 1/2021 | Muneta et al. |
| 2021/0046639 | A1 | 2/2021 | Ravi et al. |
| 2021/0096824 | A1 | 4/2021 | Stump et al. |
| 2021/0101282 | A1 | 4/2021 | Yoneyama |
| 2021/0133670 | A1 | 5/2021 | Cella et al. |
| 2021/0138651 | A1 | 5/2021 | McGregor et al. |
| 2021/0141870 | A1 | 5/2021 | McGregor et al. |
| 2021/0178575 | A1 | 6/2021 | Riek et al. |
| 2021/0323167 | A1 | 10/2021 | Hemes et al. |
| 2021/0369353 | A1 | 12/2021 | Nikou et al. |
| 2021/0375439 | A1 | 12/2021 | McKinnon et al. |
| 2022/0147026 | A1 | 5/2022 | Poelman et al. |
| 2022/0219327 | A1 | 7/2022 | Riek et al. |
| 2023/0019873 | A1* | 1/2023 | Landon ................. G06T 7/75 |

FOREIGN PATENT DOCUMENTS

| | | |
|---|---|---|
| EP | 2498156 A2 | 9/2012 |
| EP | 2871544 A2 | 5/2015 |
| EP | 3476545 A1 | 5/2019 |
| EP | 3476549 A1 | 5/2019 |
| EP | 3705239 A1 | 9/2020 |
| JP | 2006-003236 A | 1/2006 |
| JP | 2018-158439 A | 10/2018 |
| WO | 2012/027541 A1 | 3/2012 |
| WO | 2018/176025 A1 | 9/2018 |
| WO | 2018/196232 A1 | 11/2018 |
| WO | 2019/064916 A1 | 4/2019 |
| WO | 2019/113618 A1 | 6/2019 |
| WO | 2019/113619 A1 | 6/2019 |
| WO | 2020/053083 A1 | 3/2020 |
| WO | 2020/190272 A1 | 9/2020 |

OTHER PUBLICATIONS

Ming-Yu et al., "Fast object localization and pose estimation in heavy clutter for robotic bin picking", The International Journal of Robotics Research, [Online] vol. 31, No. 8, Jul. 2012 (Jul. 2012), pp. 951-973, XP055975134.

Shure Loren: "Carving a Dinosaur", Dec. 16, 2009 (Dec. 16, 2009), pp. 1-9, XP055975843.

(56) References Cited

OTHER PUBLICATIONS

Alexander Perzylo, Intuitive Instruction of Industrial Robots: Semantic Process Descriptions for Small Lot Production, 2016, pp. 1-6. https://ieeexplore.ieee.org/stamp/stamp.jsp?tp=&arnumber=7759358 (Year: 2016).

Alexei Vassiliev, Designing the Built-In Microcontroller Control Systems of Executive Robotic Devices Using the Digital Twins Technology, 2019, pp. 1-5. https://ieeexplore.ieee.org/stamp/stamp.jsp?tp=&arnumber=8843814 (Year: 2019).

Fuchs et al., "Cooperative bin-picking with Time-of-Flight camera and impedance controlled DLR lightweight robot III", Intelligent Robots and Systems (IROS), 2010 IEEE/RSJ International Conference on, IEEE, Oct. 18, 2010, pp. 4862-4867.

Garrett Thomas, Learning Robotic Assembly from CAD, 2018, pp. 1-8. https://arxiv.org/pdf/1803.07635.pdf (Year: 2018).

Hatem Fakhurldeen, CARA system Architecture—A Click and Assemble Robotic Assembly System, 2019, pp. 5830-5835. https://ieeexplore.ieee.org/stamp/stamp.jsp?tp=&arnumber=8794114 (Year: 2019).

Igor Azkarate Fernandez, Virtual commissioning of a robotic cell: an educational case study, 2019, pp. 1-6. https://ieeexplore.ieee.org/stamp/stamp.jsp?tp=&arnumber=8869373 (Year: 2019).

Lu et al., An on-line relative position and orientation error calibration methodology for workcell robot operations, Robotics and Computer Integrated Manufacturing, vol. 13, No. 2, Jun. 1, 1997, pp. 89-99.

Maragkos et al., "Virtual Reality Assisted Robot Programming for Human Collaboration", 29th International Conference on Flexible Automation and Intelligent Manufacturing, Procedia Manufacturing, vol. 38, 2019, pp. 1697-1704.

Marc Priggemeyer, Interactive calibration and visual programming of reconfigurable robotic workcells, 2018, pp. 1936-1401. https://ieeexplore.ieee.org/document/8452707 (Year: 2018).

Middelplaats, L.N.M., "Automatic Extrinsic Calibration and Workspace Mapping : Algorithms to Shorten the Setup time of Camera-guided Industrial Robots", Delft University of Technology, Jun. 11, 2014, pp. 1-144.

Niki Kousi, Digital twin for adaption of robots' behavior in flexible robotic assembly lines, 2019, pp. 121-127. https://www.researchgate.net/publication/330669566_Digital_twin_for_adaptation_of_robots%27_behavior_in_flexible_robotic_assembly_lines (Year: 2019).

Solhaug Linnerud, CAD-based system for programming of robotic assembly processes with human-in-the-loop, Jul. 2019, pp. 2303-2308. https://ieeexplore.ieee.org/stamp/stamp.jsp?arnumber=8781385 (Year: 2019).

Stefan Profanter, A Hardware-Agnostic OPC UA Skill Model for Robot Manipulators and Tools, 2019, pp. 1061-1068. https://ieeexplore.ieee.org/stamp/stamp.jsp?tp=&arnumber=8869205&isnumber=8868236 (Year: 2019).

Vladimir Kuliaev, Towards Product Centric Manufacturing: From Digital Twins to Product Assembly, May 2019, pp. 164-170. https://ieeexplore.ieee.org/stamp/stamp.jsp?tp=&arnumber=8972137 (Year: 2019).

Wikipedia, "Digital Twin", Available Online at <https://en.wikipedia.org/w/index.php?t%20itle=Digital%20twin&oldid=924505803#Industry%20-level%20dynam,cs>, Nov. 4, 2019, 16 pages.

\* cited by examiner

METHOD AND APPARATUS FOR VISION-BASED TOOL LOCALIZATION

RELATED APPLICATION

The present application claims priority to U.S. Provisional Application No. 63/203,326 filed on Jul. 16, 2021, and incorporates that application in its entirety.

FIELD

The present invention relates to tool localization, and more particularly to vision-based tool contact area localization.

BACKGROUND

In robotic systems, the end effector, or tool, is the device at the end of a robotic arm that is used to interact with other elements. For example, a gripper to pick up an object and move it is considered such a tool; so is a screwdriver, a glue tip, a push pin inserter, etc. In order for a robot to function correctly, it must correctly position this tool with respect to other elements in the environment. If the robot believes the tool tip is at position X1, but it is actually at position X2, that could not only not work to appropriately exert force but could actually damage the element being assembled. Even a discrepancy of a fraction of a millimeter can cause damage when inserting a chip into a socket. Therefore, accurate localization of a tool tip is vital to useful robotics.

FIG. 1 illustrates a prior art approach to such localization. The "3 point teach" approach requires a user to control the robot arm to physically move the robot arm to each point, to set a precise teach point. This limits the precision to the user's ability to see the tool center point, and the large posture changes in the arm are a risk. It is also a laborious and time-consuming process.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

A vision-based tool localization is described. The system utilizes cameras or other sensors to obtain images and use that information to accurately localize a tool and does not require the user to manually control the robotic arm to localize the tool. In one embodiment, the system may be used to locate a tool center point (TCP) or a tool contact area (TCA). The tool contact area represents a contact point or contact surface. In one embodiment, the user can visually identify the tool contact area. The tool center point represents the rotation point around which the tool moves. It may not be a contact area of the tool, and may be calculated based on interpolation from the visually identifiable tool contact areas. The images are visual or non-visual representations of the tool, which may be obtained by cameras and/or other sensors.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
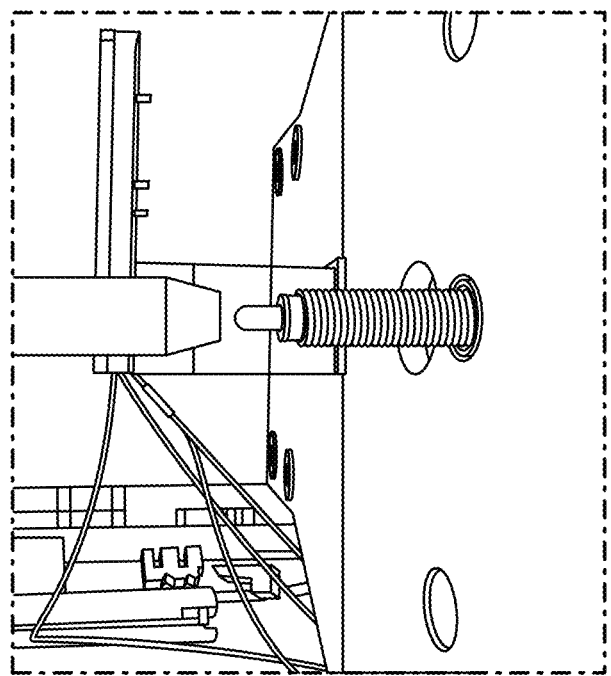
FIG. 1 is an illustration of a prior art method of identifying a tool tip.
Figure 1:
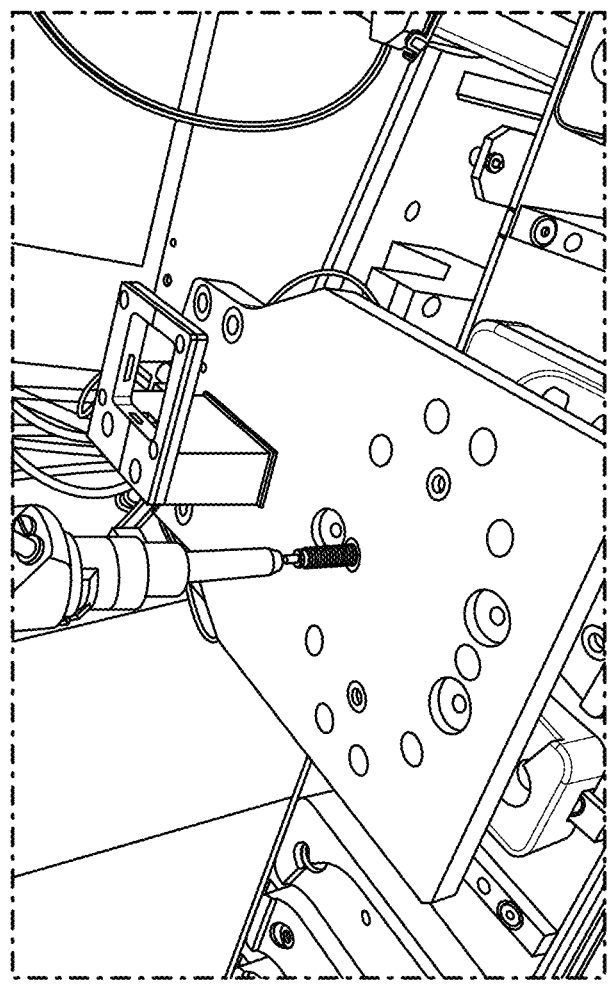
Figure 2:
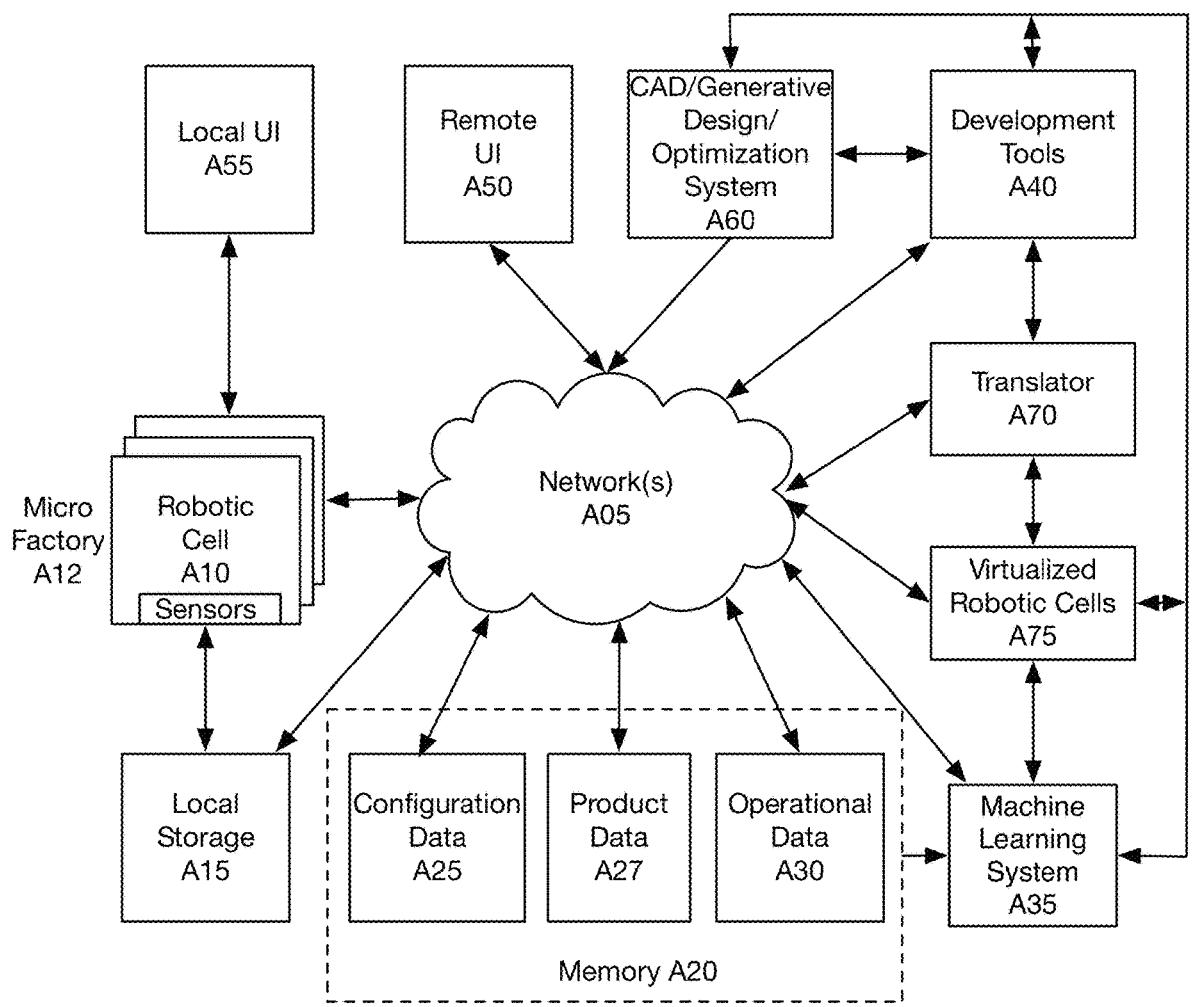
FIG. 2 is a block diagram of one embodiment of a system in which tool localization may be used.

FIG. 2 is a block diagram of one embodiment of a system in which tool localization may be used. In one embodiment, robotic cells A10 include one or more individual robotic cells which together form the software defined manufacturing line, or micro factory A12. In one embodiment, individual robotic cells A10 may be linked via conveyors, and reverse conveyors, so that a single item being manufactured or assembled through the micro factory passes through one or more robotic cells A10 (or multiple times through one or more cells A10). The robotic cells A10 may provide manufacturing, assembly, inspection, and/or testing of products.

For simplicity, the term "manufacturing" will be used, however, it should be understood that this term is being used for any process which is part of making a product, including inspection, manufacturing and/or assembly, validation, and testing.

In one embodiment, the robotic cells A10 are controlled by software. In one embodiment, the configuration and control data for the robotic cells A10 are applied to the cell from memory A20. In one embodiment, the memory A20 may be part of a remote system, coupled to the robotic cells A10 via network A05. The configuration data A25 defines the software configuration for each robotic cell A10 and the manufacturing line. Each robotic cell is calibrated prior to use, based on configuration data A25. In one embodiment, the robotic cells A10 are also continuously calibrated, as will be described below in more detail.

In one embodiment, the robotic cells A10 collect operational data while being calibrated, tested, or used. This operational data A30 is stored in memory A20 and used by machine learning system A35. In one embodiment, local storage A15 provides backup for configuration data for the robotic cell, as well as operational data produced by the robotic cell while it is in use. Local storage A15 in one embodiment acts as a buffer for memory A20. In one embodiment, if the robotic cell A10 becomes disconnected from the network A05, it may continue to operate and collect real time operational data, using local storage A15.

In one embodiment, because the cells are software configured, a single robotic cell A10 may perform multiple stages in the manufacturing process and may be reconfigured during the manufacturing process. In one embodiment, this also enables the substitution of robotic cells A10 in a micro factor during manufacturing without extensive reconfiguration. In one embodiment, this also permits the addition of cells into a micro factory.

In one embodiment, robotic cells A10 include a local user interface (UI) A55, enabling interaction with the robotic cell A10 on the manufacturing floor. In one embodiment, the local user interface A55 may provide a joystick-based interaction, enabling direct control of the elements of the robotic cell.

In one embodiment, in addition to the local UI A55, there may be a remote UI A50, coupled to the robotic cell A10 via a network A05. The remote user interface A50 may be a portable user interface, such as a tablet. The remote user interface A50 may be linked to the robotic cell A10 via a local area network (LAN), personal area network (PAN), or another type of network. In one embodiment, some remote UIs A50 may require proximity to a robotic cell A10, while other remote UIs A50 may be operable from anywhere. In one embodiment, the functionality and control elements presented on a user interface may vary based on one or more of the robotic cell A10, the configuration of the robotic cell A10, the identity/qualifications of the individual who is logged into the user interface, and proximity to the physical cell. In one embodiment, the local UI A55 and remote UI A50 provide identical human-machine-interface (HMI) elements, layouts, and functionality, reducing complexity for the operators interacting with the robotic cells A10. In one embodiment, the user interface provides a unified HMI across all robotic cell types and configurations.

In one embodiment, for the production of an end product, the process starts with development tools A40. In one embodiment, these tools may be made available to designers remotely. In one embodiment, these tools may be provided online, through a Software as a Service (SaaS) type interface. In one embodiment, the development tools A40 enable the creation of a manufacturing line including one or more robotic cells A10. In one embodiment, each robotic cell A10 has certain capabilities. The development tools A10 enable a user to create a manufacturing line using one or more of the robotic cells A10 to create the end product.

In one embodiment, CAD/Generative Design tools A60 may be used to create a CAD design for the end product to be made. In one embodiment, when using CAD/Generative Design tools A60, the system may take into account the manufacturing/assembly limitations of the robotic cells A10 in designing the end product. In one embodiment, the CAD/Generative Design tools A60 may receive data from development tools A40 and may iterate the end product design based on issues identified through the development tools A40. The output of the development tools A40 is a sequence of operations for each robotic cell.

Once a design is generated, translator A70 translates the sequence of operations to control commands for an individual robotic cell. In one embodiment, the output of development tools A40 is in a language which describes the configuration and actions taken by a robotic cell. Because each individual robotic cell includes multiple elements, which may utilize different control languages, the translation is quite complex. Furthermore, different robotic cells performing the same sequence of operations may have elements that are from different manufacturers or have different configurations. For example, a robotic arm may have a plurality of movement joints, and the joints may have different limitations. Thus, a single command in the sequence of operations may be translated differently for each individual robotic cell.

The translated control commands may be applied to a virtualized robotic cell A75. The virtualized robotic cell A75 is a software representation of the individual configured robotic cell, and may be used for testing and verification, because in one embodiment it is configured to simulate the actual robotic cell. In one embodiment, virtualized robotic cells A75 may use operational data A30 from actual robotic cells A10 to enable a user to view the actions of a physical robotic cell A10 remotely. In one embodiment, a user may preview the robotic cell's actions during a process, may track the actual actions during the process, and/or review the actual actions after the process using virtualized robotic cells A75.

The output of the translator A70, once validated and verified, is stored as configuration data A25. The configuration data A25 is applied to physical robotic cells, as discussed above.

In one embodiment, a machine learning system A35 is used to provide data for iterative learning and improvements to the process.

In one embodiment, although the elements here are shown as individual elements, one of skill in the art would understand that the design tools A60, development tools A40, translator A70, virtualized robotic cells A75, and machine learning system A35 are implemented on one or more computer systems. The computer systems may be stand-alone devices, servers, or cloud-based systems which are accessed through network A05. In one embodiment, the elements described may be implemented on a single server system. In one embodiment, the elements described may be implemented on multiple unrelated computer/server systems. In one embodiment, though only a single block is illustrated for an element like development tools A40, the real tool may be distributed over multiple devices.

Figure 3:
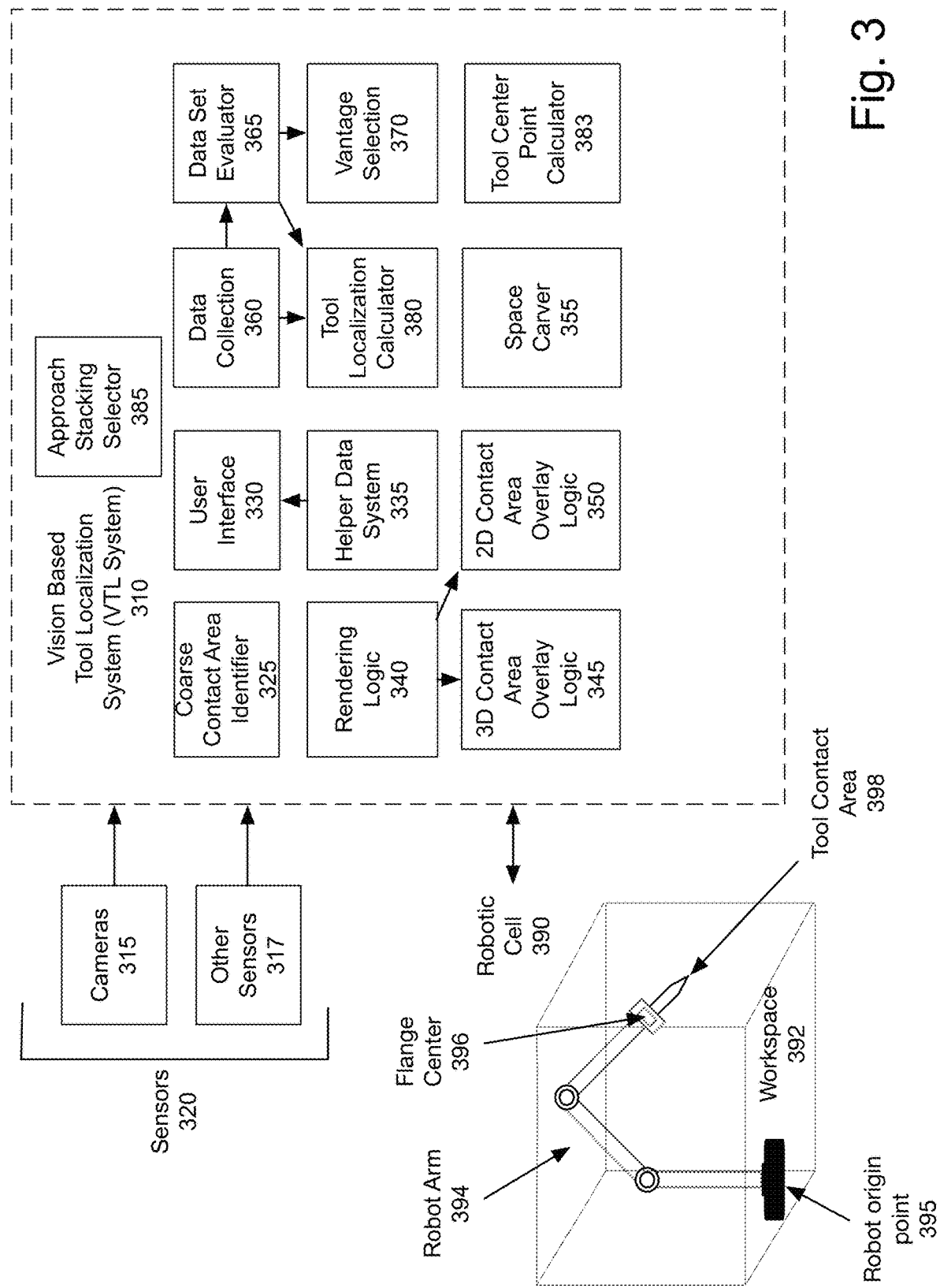
FIG. 3 is a block diagram of one embodiment of the vision-based tool localization (VTL) system.

FIG. 3 is a block diagram of one embodiment of the vision-based tool localization (VTL) system. The vision-based tool localization system (VTL) system 310 is implemented in one embodiment with a processor which receives data from one or more of sensors 320, which may include cameras 315 and other sensors 317, and robot arm 394. In one embodiment, the processor may be part of the robotic system. In another embodiment, the processor may be a remote system which communicates with the robotic cell 390 via a network. In one embodiment, this processing may be split between the local system of the robotic cell and a remote server.

The sensors 320 obtain image data. Image data, as used in the present application, refers to a visual or non-visual representation of an object. In one embodiment, the image may be a gridded pixel representation of sensed data. The data may be directly or indirectly sensed. For indirectly sensed data, the system may reconstruct the image. The image may be from a camera, or another sensor. Thus, the term "image" is used to refer to any visual or non-visual representation of the portion of the work area which is used by the present system to localize the tool.

The VTL system 310 in one embodiment includes a coarse contact area identifier 325. The coarse identifier 325 in one embodiment identifies the approximate position of the tool contact area in the volume of the robotic cell 390. In one embodiment, as noted above, the robotic cell 390 has a "workspace" 392 within which the robotic arm 394 may move. The workspace 392 may be the full volume of the robotic cell, within which the robotic arm 394 can move, as illustrated. In another embodiment, the workspace 392 may be defined as a subset of the full robotic cell area. For example, the workspace 392 may be defined as the preferred working zone of the robotic arm, in which the movement can be most precisely tracked and controlled. Other ways of defining a workspace 392 may be used.

In one embodiment, the precise position of the tool contact area 398 is defined by the VLT system. In one embodiment, the position of the tool center point is defined. The tool center point defines the position around which the tool is moved. For some tools, the tool center point may be identical to the tool contact area. For some tools, the tool center point may be outside the tool itself. For example, for a gripper, the tool center point may be the center point between the two or more gripping fingers. In one embodiment, the position of the tool contact area 398 is determined with respect to the position of the flange center 396 of the robotic arm 394. The relationship between the flange center 396 and the robot origin point 395 is defined by the calibration of the system. The robot origin point 395, in one embodiment, is a center of a base of the robot.

The coarse identifier 325 in one embodiment utilizes data from sensors 320 to provide an approximate position. This data is used, in one embodiment, to provide the initial image to the user, for selecting the tool contact area. In one embodiment, this block may be eliminated, with the process may start with no data beyond the image data from one or more sensors 320.

User interface 330 enables the user to interact with the system to assist in identifying the tool contact area.

In one embodiment, the system displays an image of the tool contact area, from one camera. The user is prompted to click on a point or line to identify the tool contact area. In one embodiment, for a point-contact area the user is prompted to click on the point. In one embodiment, for a line contact area, the user is prompted to select two or more points on the line. In another embodiment, the user is prompted to select one point on the line, and in a subsequent selection select a different point on the line. In one embodiment, helper data system 335 displays an estimated location of the tool contact area. In one embodiment, helper data system 335 displays lines of sight from the camera to previously clicked tool contact points. Data collection 360 collects the data from user interface 330.

In another embodiment, the user interface 330 enables the user to align a two-dimensional or three-dimensional outline of the tool contact area with the image shown from a camera. In one embodiment, for such an alignment, rendering logic 340 renders an image of the tool contact area. This rendering is designed to orient the tool contact area in a way to match the actual visual image—e.g., what the user sees from the current image. For the 3D contact area overlay logic 345, the system generates an appropriate image and attempts to overlay it over the image. The user can adjust the overlay via user interface 330. For the 2D contact area overlay logic 350, the two-dimensional outline of the figure is overlaid and may be adjusted by the user, in one embodiment. The output from the user interface 330 is passed to the data collection 360.

Each of these approaches utilizes a set of images, and over time creates an accurate representation of the tool center point. In one embodiment, the images may be taken by different cameras, providing different vantage points of a stationary robotic arm with the tool. In another embodiment, the images may be taken by one or more cameras, and the robotic arm with the tool may be moved, to create multiple images from different vantage points.

In another embodiment, the VTL system 310 uses space carver 355 to determine the position of the tool contact area. Space carver 355 takes the image of the tool contact area and carves away the portion of the image that is not the tool contact area. The resulting "carved" 3D image represents the correct tool contact area.

Data collection 360 collects the data from the one or more approaches. In one embodiment, data collection 360 utilizes a memory to store the plurality of images. Data set evaluator 365 determines whether the set of images evaluated is sufficient to provide a high enough confidence to correctly define the tool contact area. In one embodiment, if the discrepancy between the latest set of positions is over a threshold, the data set evaluator 365 determines that there is not sufficient data, and additional data is acquired. In one embodiment, the threshold may be dependent on the tool and the task, and sensor/camera resolution. In one embodiment, the threshold may be between 0.1 mm and 5 mm. In one embodiment, the threshold may be dependent on a number of available vantage points.

If the data set evaluator 365 determines that the selections are not sufficiently accurate, in one embodiment vantage selection 370 selects a new vantage point for additional images. In one embodiment, the new vantage may be images from another camera, images from another sensor, or images from a camera that had been previously used but with the robotic arm in a different position with respect to the camera. In one embodiment, the data set evaluator 365 may alternatively trigger a reevaluation of an existing image, with additional helper data from helper data system 335. For example, if the first set of images are inaccurate, but with the additional helper data the system and/or the user may be able to select the tool contact area more accurately, the images may be reprocessed.

In one embodiment, the different approaches for tool contact area localization (user selection, 2D overlay, 3D overlay, and space carving) may be layered. In one embodiment, an approach may be selected based on the tool being analyzed. For example, for a concave tool such as a socket, a 2D or 3D fitting may be better than clicking on locations for the tool. For a round tool, or one which does not have easily identified corners, lines or points, the user selection may not be a preferred approach. In one embodiment, approach stacking selector 385 determines which approaches to use, and triggers the appropriate processes for the selected approaches. In one embodiment, the determination of the tool contact area may have three layers. The first layer is a pure human input layer (e.g., the user selecting the tool contact area). The second layer is human selection with a proposed location shown for correction or approval to the user. The third layer is an automated layer, in which the user may optionally approve the automated positioning.

In one embodiment, the system utilizes one or more of the approaches, and then assigns a weight to each approach. The weight depends on the estimated accuracy of the approach for the particular tool being localized. The tool localization calculator 380 can then use the weights from approach stacking selector 385 to calculate the final position of the tool contact area. In one embodiment, the weighting depends on the positioning consistency across the multiple images. In one embodiment, the weighting depends on the type of tool contact area being evaluated. In one embodiment, certain types of tool contact areas are easier evaluated with different approaches. For example, a sharp tipped tool may be best localized using a user selection, whereas an irregularly shaped tool contact area may be best evaluated using a 3D overlay. In one embodiment, a transparent or reflective tool may not do well with a 3D overlay. In one embodiment, the stacking selector 385 weights the approaches, and the data set evaluator selects the best approach, based on the weighting.

Once the data set evaluator 365 determines that the number of selections meet a threshold for accurate calculations, to the tool localization calculator 380 determines the position of the tool contact area. In one embodiment, the threshold is a number of measurements. In one embodiment, the threshold is a set of measurements that boxes in the tool contact area with adequate accuracy. In one embodiment, adequate accuracy ranges between 100 to 250 microns.

In one embodiment, the system may further utilize the data from the tool localization calculator 380 to determine the tool center point via tool center point calculator 383. Tool center point calculator 383 utilizes the calculated locations of the tool contact area(s), and knowledge of the tool configuration to calculate the orbit point around which the tool is moved. In one embodiment, the calculation interpolates between the identified points/lines of the tool contact area.

The output of the VTL system 310 is the position of the tool contact area and/or tool center point. In one embodiment, the position of the tool contact area and/or tool center point is output as off-sets to a flange center 396 of the robot arm 394. This data is used to ensure that the robotic arm 394 is controlled accurately, in manufacturing and assembly processes, to correctly position the tool contact area 398 as described above.

Figure 4:
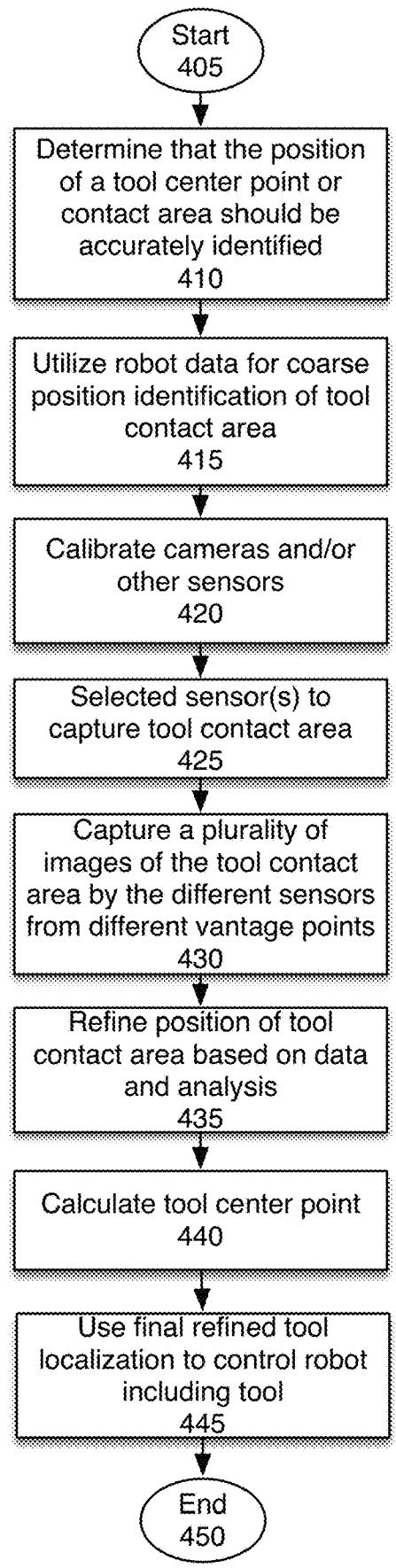
FIG. 4 is an overview flowchart of one embodiment of tool localization.

FIG. 4 is an overview flowchart of one embodiment of tool localization. The process starts at block 405. At block 410, the process determines that the tool contact area (TCA) and/or tool center point (TCP) should be accurately localized. In one embodiment, this process is initiated whenever a new tool is selected by the robotic arm. In one embodiment, this process may be triggered when an accuracy issue is detected by the system, indicating that the actual position of the tool does not match the projected location. In one embodiment, the process may be triggered when the robotic cell is moved or otherwise shifted in a way that would cause an issue with the accuracy of the tool localization.

At block 415, robot data is used for coarse position identification of the tool contact area. In one embodiment, the robot data may include image data, robotic arm positioning data, or other data. In one embodiment, the coarse position identification identifies the tool contact area within a centimeter or two, or a few millimeters. This provides an initial area for evaluation.

At block 420, the process calibrates the cameras and/or other sensors. The cameras and sensors are used to obtain images for the tool contact area calculation.

In one embodiment, the cameras are calibrated using one or more fiducials. The camera calibration, in one embodiment, ensures that tool contact area position is accurately identified, based on data from one or more cameras providing images from multiple vantage points. In one embodiment, the process described in co-pending application U.S. Provisional Application 63/198,757, entitled Method and Apparatus for Improved Auto-Calibration of a Robotic Cell, is utilized for calibrating the cameras.

At block 425, a system selects a set of sensors to obtain images of the tool contact area. In one embodiment, the set of sensors is identified based on the coarse position, to ensure that the image data captured includes the tool contact area and the image is not occluded by wires or the tool shoulder. In one embodiment, the sensors are manually identified by a user, for each approximate position of the tool. In one embodiment, the system automatically identifies the sensors, based on the coarse position and known shape of the tool At block 430, a plurality of images of the tool contact area are captured by the selected set of sensors from a plurality of different vantage points. In one embodiment, the robotic arm/tool is not moved, but rather a plurality of cameras or other sensors capture the plurality of images. In another embodiment, the robotic arm is moved to a plurality of positions, and one more cameras or other sensors capture a plurality of images. In one embodiment, if the robotic arm is moved, in addition or instead of selecting the sensors, the system may select the positioning of the robotic arm to avoid occlusion.

At block 435, the location is refined, based on user input and/or analysis, as will be described in more detail below. In one embodiment, the refined position of the tool contact area is with respect to a flange center of the robot arm.

At block 440, the process calculates the tool center point. In one embodiment, the tool center point may be identical to the tool contact area. In another embodiment, the tool center point may be interpolated based on data from one or more tool contact areas.

At block 445, the refined tool localization is used to accurately control the robot arm, including the tool. The tool localization is generally used to enable the robotic cell to interact with parts that are manufactured or assembled. For example, the robotic cell may be assembling a printed circuit board, and the tool may be a gripper to pick up a heatsink for insertion onto the printed circuit board, or a screwdriver to attach a part. Thus, the accuracy of the tool contact area is important to ensure accurate assembly and manufacturing processes. The process then ends at block 450.

Figure 5A:
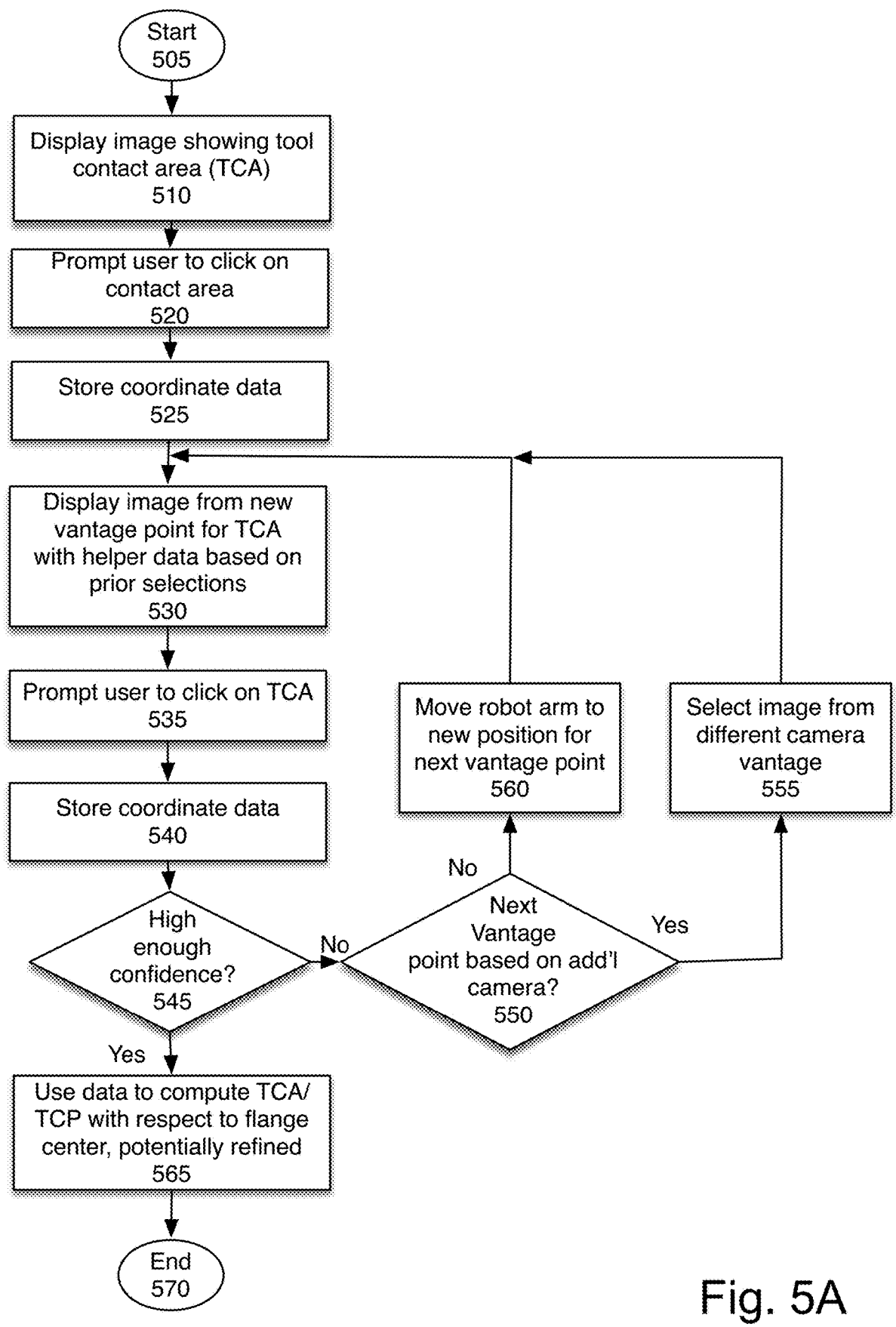
FIG. 5A is a flowchart of one embodiment of using user input for tool localization.

FIG. 5A is a flowchart of one embodiment of using user input for tool localization. This process is one approach for the position refinement process described in Block 430 of FIG. 4. The process starts at block 505.

At block 510, an image showing the tool contact area is displayed. In one embodiment, this image is the coarse image, obtained based on the robotic arm position and/or other images.

Figures 5B, 5C, 5D:
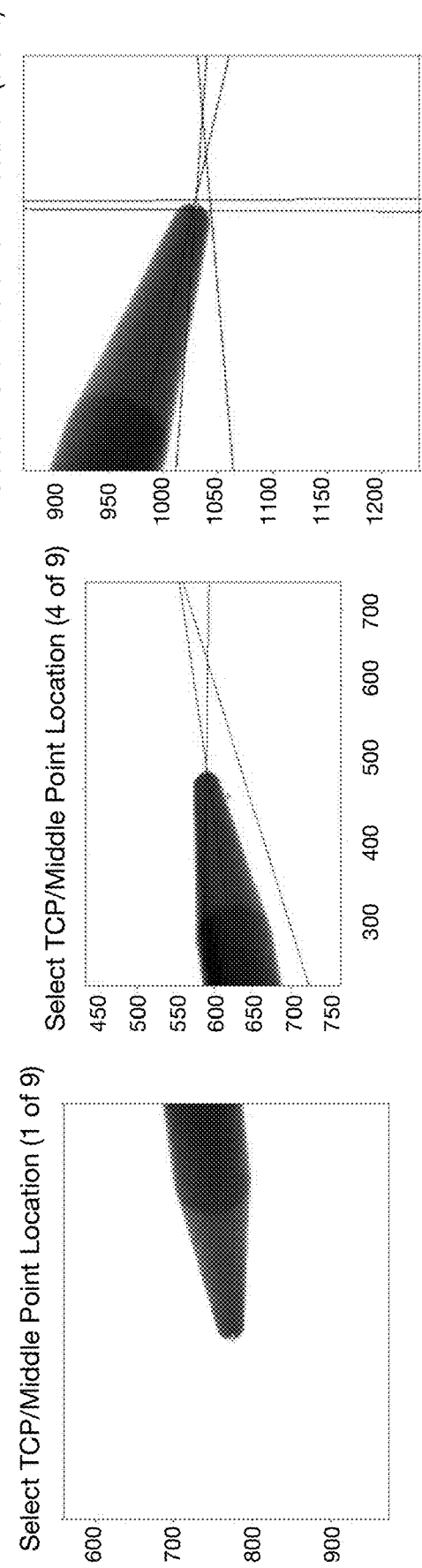
FIGS. 5B-5D are exemplary displays which may be used with the user input for tool localization.

At block 520, the user is prompted to click on the tool contact area. In one embodiment, the tool contact area may be a point, such as for a glue dispenser tip. In one embodiment, the tool contact area may be a line, a plane, or a more complex shape. In one embodiment, the user may be prompted to click on a particular point. In one embodiment, the user may be prompted to click on two points, to define a line, and the line may be displayed. In one embodiment, the user may be prompted to click on three points to define a plane, and the plane may be displayed. FIG. 5B illustrates an exemplary section showing where the user selected the tool contact area.

In one embodiment, after making the selection, the user may then adjust the position of the point, line, or plane. In one embodiment, the user may confirm the selection, or reject the selection and re-enter it. At block 525, the coordinate data for the selection is stored.

At block 530, another image from a different vantage point is displayed. In one embodiment, helper data based on prior selections is shown, to assist the user in selecting the tool contact area. FIGS. 5C and 5D illustrate one example of helper data. The helper data shown are the lines of sight from the prior images, showing the tool contact area previously selected. Alternate helper data may be a circle in the estimated tool contact area, based on data collected so far.

At block 535, the user is prompted to click, as above. At block 540, the coordinate data is stored.

At block 545, the process determines whether the data provides a high enough confidence interval for finalization the calculation. In one embodiment, the confidence interval is based on a deviation between successive selections. In one embodiment, the threshold for determining whether there is enough data may be fixed (e.g., at least six selections), may be adjusted based on accuracy (e.g., at least two selections that are substantially identical), may be adjusted based on weight (e.g., confidence in the selection is above a threshold). Another type of determination may be used.

If there are sufficient selections, at block 565, the data is used to compute the TCA and/or TCP. In one embodiment, the computation is with respect to a flange center of the robot arm. In one embodiment, as will be discussed below, this calculation may be further refined using another approach. The process then ends, at block 570.

If the selections were not sufficient for the appropriate level of confidence at block 545, at block 550 the process determines whether the next vantage point is based on an additional camera, or on another image from the same camera. If the next vantage is from another camera, at block 555 an image is selected, and the process returns to block 530 to display the image and prompt the user to select. If the next vantage point is from the same camera, at block 560 the robot arm is moved to a new position for the next vantage point. The process then returns to block 530. In one embodiment, the images may all be acquired at a first time, and the process of user selection may take place at a second time. In that instance, the process selects one of the previously acquired images. In this way, the system localizes the tool based on input from the user. As noted above, in one embodiment, the system may combine this approach with one or more other approaches to obtain the final localization.

Figure 6A:
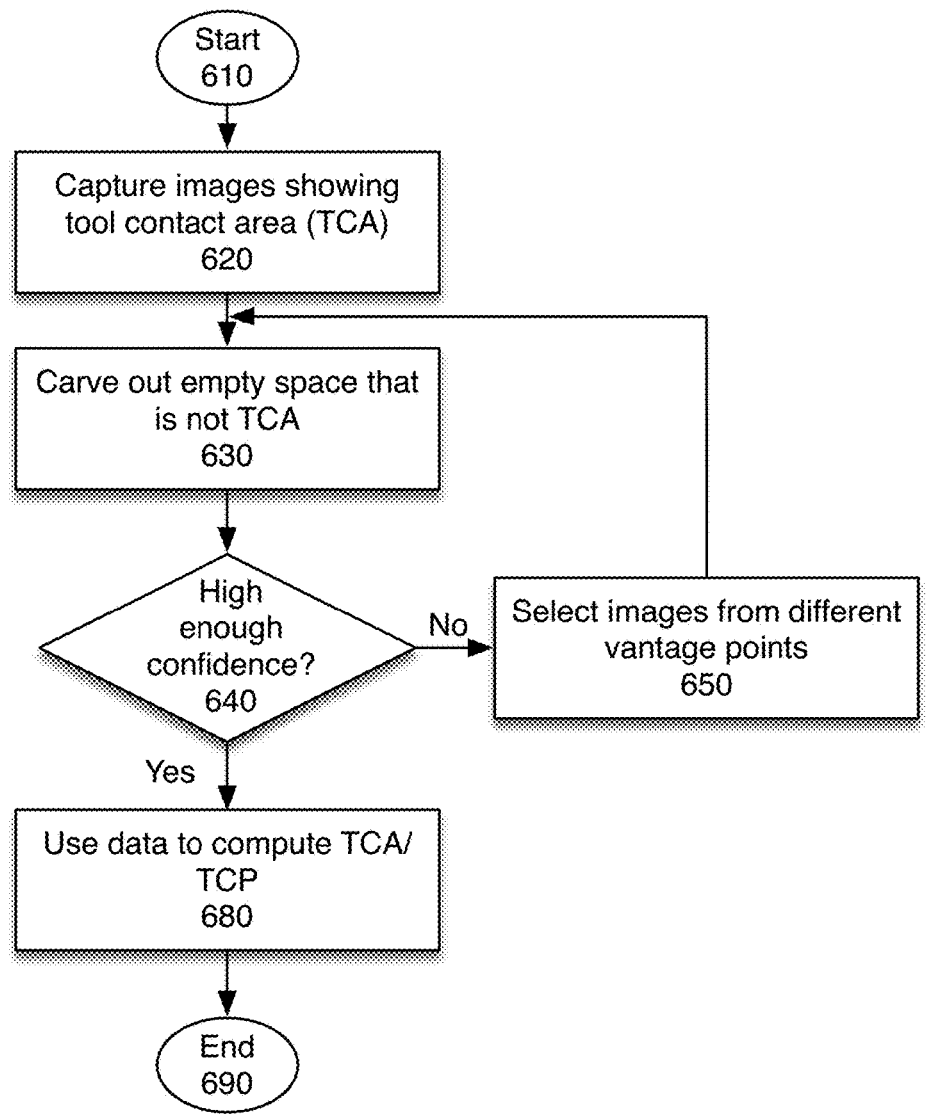
FIG. 6A is a flowchart of one embodiment of using space carving for tool localization.

FIG. 6A is a flowchart of one embodiment of using space carving for tool localization. This process is another approach for the position refinement process described in Block 430 of FIG. 4. The process starts at block 610.

At block 620, one or more images are captured showing the tool contact area. In one embodiment, this image is the crude location-based image. In another embodiment, the image may be pre-processed based on data from other approaches.

Figure 6B:
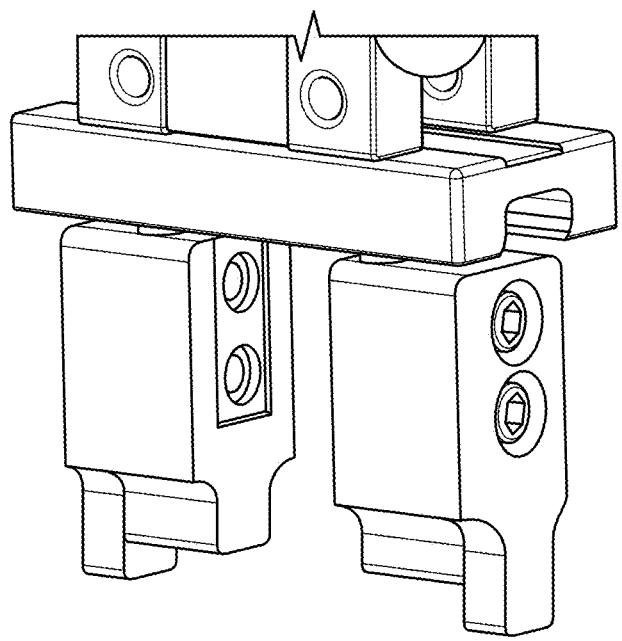
FIGS. 6B and 6C illustrate one embodiment of space carving.
Figure 6C:
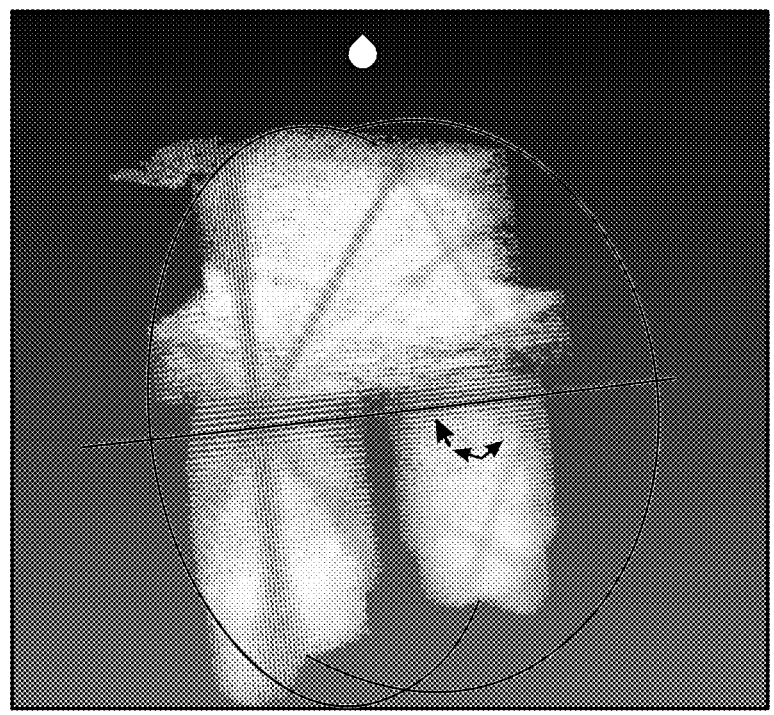

At block 630, the system carves out the empty space that is not the tool contact area. Free space carving utilizes a set of images of an object to carve away the portion of an imaged 3D object that is not occupied in each of them, and thereby define the bounding geometry of the actual 3D object. FIGS. 6B and 6C illustrate one embodiment of bounding geometry-based localization. FIG. 6B illustrates a camera image of the tool contact area. FIG. 6C illustrates an exemplary point cloud created by space carving. In one embodiment, space carving splits the volume into voxels, and for each voxel determines whether it is occupied. In one embodiment, the plurality of images ensure that the three dimensional area is analyzed. In one embodiment, the voxels are between 20 microns and 500 microns. In one embodiment, the voxels are 100 micron voxels.

Returning to FIG. 6A, at block 640 the process determines whether there is sufficient data to confirm that the 3D object created is accurate. In one embodiment, this is determined based on a confidence interval for the calculated position. If the confidence interval does not meet the appropriate level, at block 650, additional images from different vantage points are selected, and the process returns to block 630 to use the additional images to carve away more of the space. Each subsequent iteration uses as its input the previously carved data, in one embodiment. In another embodiment, subsequent iterations may be independent, and the iterations may be additive.

When there is a sufficient level of confidence, at block 680 the data is used to compute the tool contact area and/or the tool center point. The process then ends at block 690.

Figure 7:
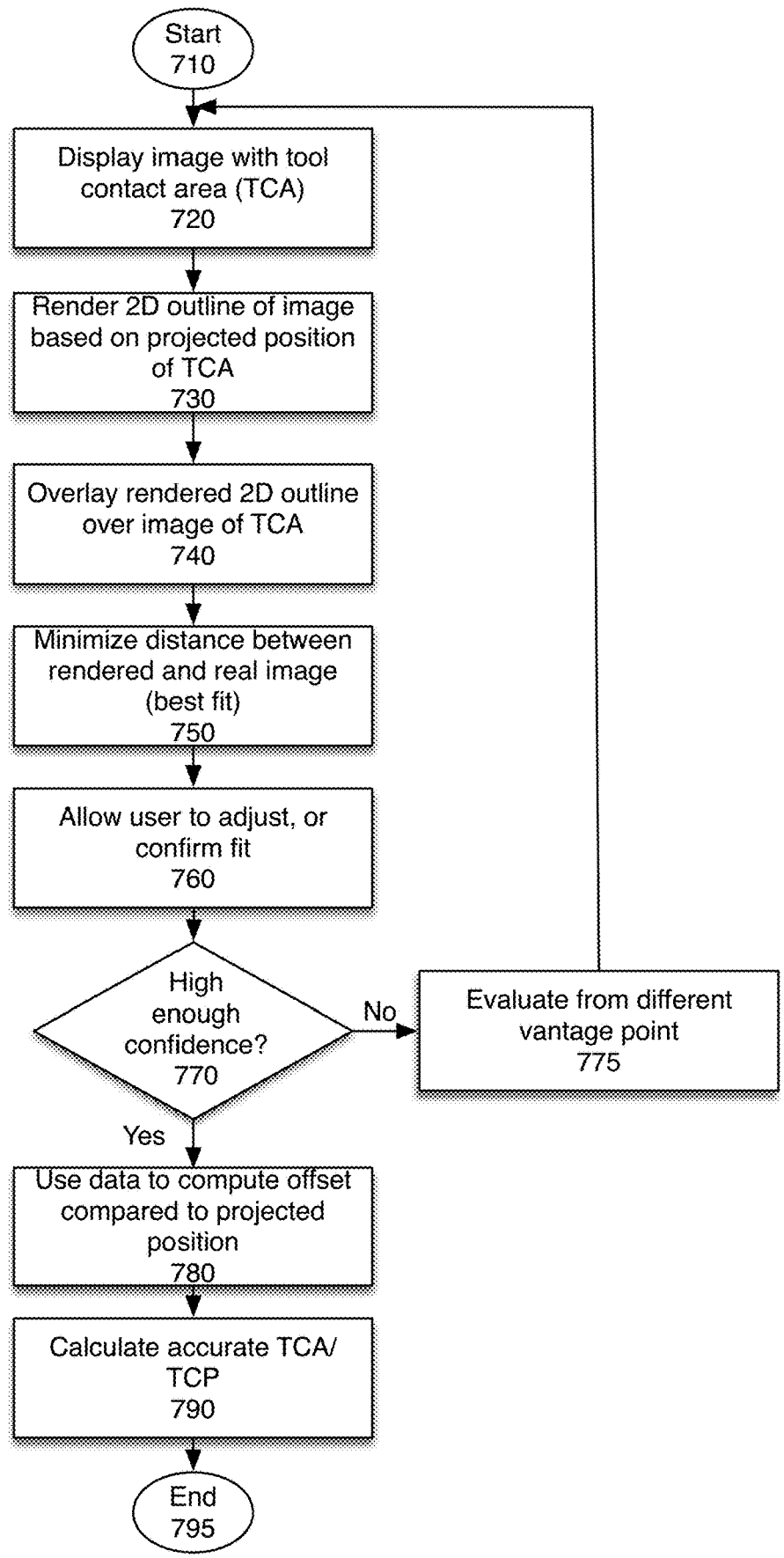
FIG. 7 is a flowchart of one embodiment of using 2D overlay for tool localization.

FIG. 7 is a flowchart of one embodiment of using 2D overlay for tool localization. This process is another approach for the position refinement process described in Block 430 of FIG. 4. The process starts at block 710.

At block 720, the image is displayed with the tool contact area. In one embodiment, this is the crude approximation image generated by the system based on the robotic arm position. In another embodiment, this may be an image previously refined through other approaches.

At block 730, a 2D outline of the image based on the projected position of the tool center point is rendered. In one embodiment, the rendering represents a two-dimensional view of the object, based on a current estimated position of the tool contact area.

At block 740, the system overlays the rendered 2D outline over the actual image of the tool contact area.

At block 750, the system minimizes the distance between the rendered image and the real image. In one embodiment, the distance minimization utilizes a best fit algorithm, such as the Iterative Closest Point (ICP) algorithm.

In one embodiment, at block 760, the user may adjust and/or approve the fit shown. In one embodiment, the user may nudge or otherwise move the fit. In another embodiment, the user may confirm that the fit is good or trigger a reevaluation. In one embodiment, if the 2D outline is not a good match for the actual position of the TCA, the user may reject the potential match entirely, and remove it from the evaluation.

At block 770, the process determines whether the confidence interval is sufficient based on the selections to calculate the TCA/TCP. If not, at block 775 a new vantage point is selected. The rendering of the 2D outline, in one embodiment, is based on the updated estimate of the TCA, based on the data to date. This leads to increased accuracy in the rendering-to-image match, over time. The process then returns to block 720 to display the image from the new vantage point.

If the confidence interval is high enough, as determined at block 770, at block 780 the data is used to calculate the offset between the real TCA and the projected position. This data is used, at block 790, to define the accurate TCA/TCP position. The process then ends at block 795.

Figure 8:
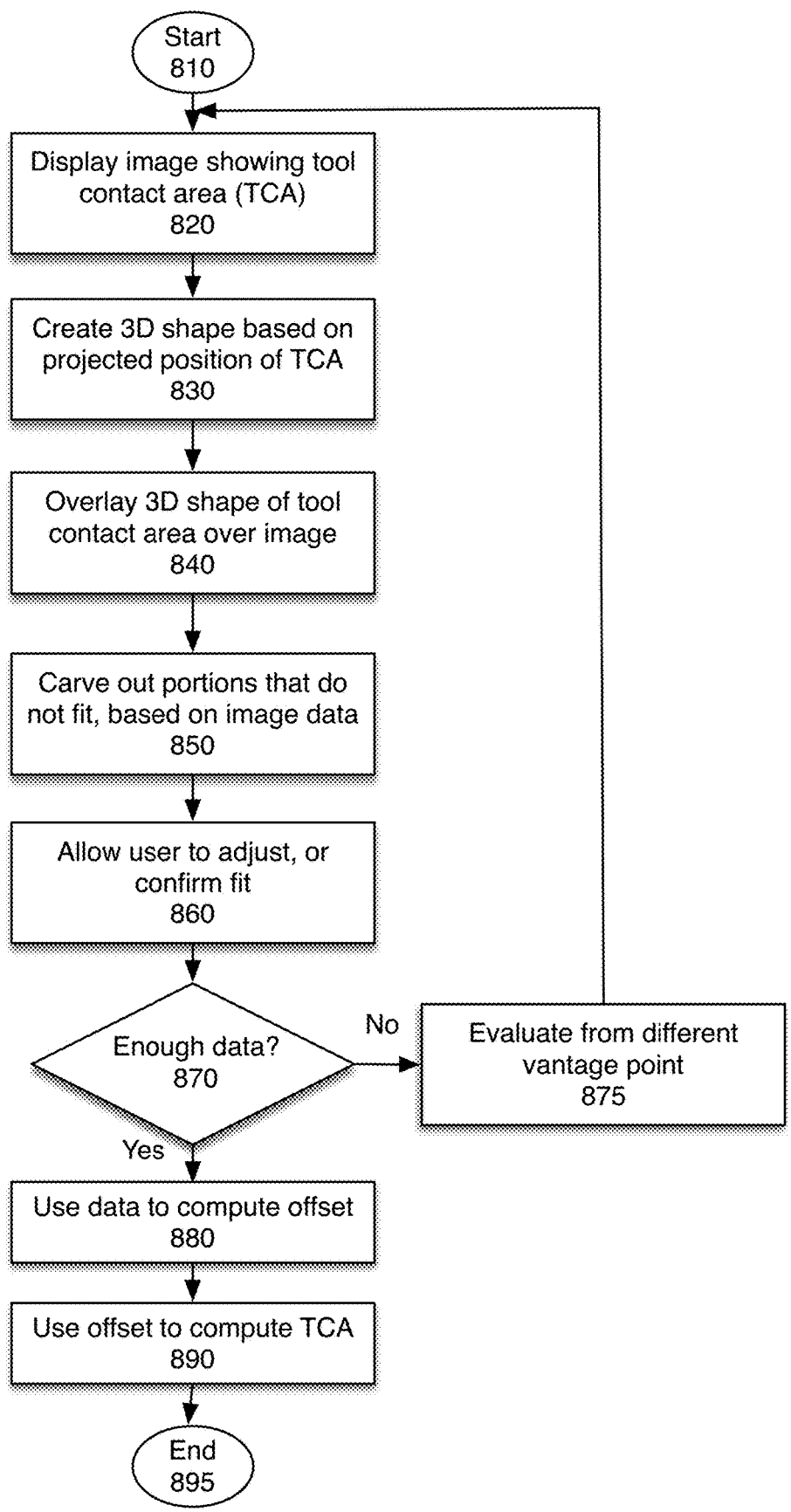
FIG. 8 is a flowchart of one embodiment of using 3D overlay for tool localization.

FIG. 8 is a flowchart of one embodiment of using 3D overlay for tool localization. This process is one approach for the position refinement process described in Block 430 of FIG. 4. The process starts at block 810.

At block 820, the image is displayed with the tool contact area. In one embodiment, this is the crude approximation image generated by the system based on the robotic arm position. In another embodiment, this may be an image previously refined through other approaches.

At block 830, a 3D shape is rendered based on the projected position of the tool contact area. In one embodiment, the 3D shape represents a view of the object, based on a current estimated position of the tool contact area with respect to the camera vantage point.

At block 840, the system overlays the rendered shape over the actual image of the tool contact area.

At block 850, the system carves out the portions of the image that do not fit, based on the overlap of the 3D shape and the tool contact area.

In one embodiment, at block 860, the user may adjust and/or approve the fit shown. In one embodiment, the user may nudge or otherwise move the fit. In another embodiment, the user may confirm that the fit is good or trigger a reevaluation.

At block 870, the process determines whether the confidence interval is sufficient to finalize the matching and calculate the TCA/TCP. If not, at block 875 a new vantage point is selected. The rendering of the 3D shape, in one embodiment, is based on the updated estimate of the TCA, based on the data to date. This leads to increased accuracy in the rendering-to-image match, over time. The process then returns to block 820 to display the image from the new vantage point.

If there is sufficient data, as determined at block 870, at block 880 the data is used to calculate the offset between the real TCA and the projected position. This data is used, at block 890, to define the accurate TCA/TCP position. The process then ends at block 895.

Figure 9A:
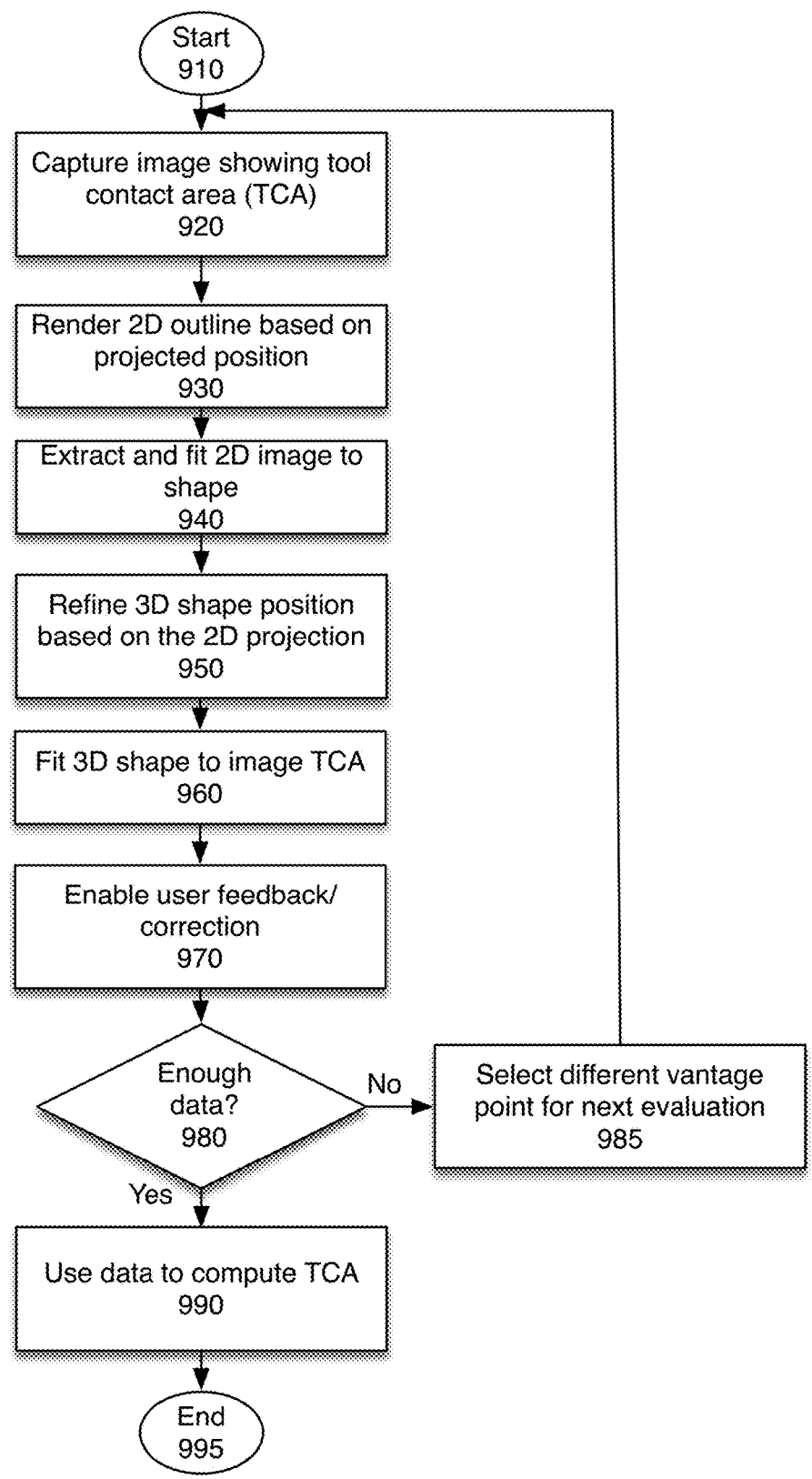
FIG. 9A is a flowchart of one embodiment of using a combination of 2D and 3D overlays for tool localization.

FIG. 9A is a flowchart of one embodiment of using a combination of 2D and 3D overlays for tool localization. This process is one approach for the position refinement process described in Block 430 of FIG. 4. The process starts at block 910.

At block 920, an image is captured showing the tool contact area.

At block 930, a 2D outline is rendered, based on the projected position of the TCA with respect to the camera or sensor that captured the image.

At block 940, the 2D image is extracted and fitted to the shape. That is, the 2D outline is fitted to the image.

At block 950, the 3D shape orientation and position are refined based on the 2D image. This provides a more accurate fitting for the 3D shape because the positioning is based on the 2D projection from the image.

At block 960, the 3D shape is fitted to the TCA, based on the adjusted rendering.

At block 970, in one embodiment, user feedback is enabled. In one embodiment, the user may suggest a change, approve the proposed fit, or reject the proposed fit. In one embodiment, if the user rejects the fit, the process returns to block 930 to attempt to re-fit, or continues to block 985 to select a different vantage point for reevaluation.

At block 980, if the user corrects or accepts the fit, the system determines whether there is enough data to calculate an accurate TCA. In one embodiment, this is based on a threshold of accuracy of the last one, two, or more fits. In another embodiment, this may be based on a simple minimum count (e.g., has the minimum number of fits been performed.) In another embodiment his may be based on a confidence interval calculated for the last fits. In one embodiment, this may be based on an improvement over multiple iterations. If there is not enough data, the process at block 985 selects the next vantage point for evaluation. In one embodiment, the next vantage point is selected to be at a remove from the prior vantage point(s). In one embodiment, each vantage point is selected at least 15 degrees offset from a prior vantage point. In one embodiment, the system ensures that at least three divergent vantage points are included in the calculation. The process then returns to block 920 to evaluate based on the image from the next vantage point.

If there are sufficient selections, at block 990 the data is used to compute the TCA/TCP. The process then ends at block 995.

Figure 9B:
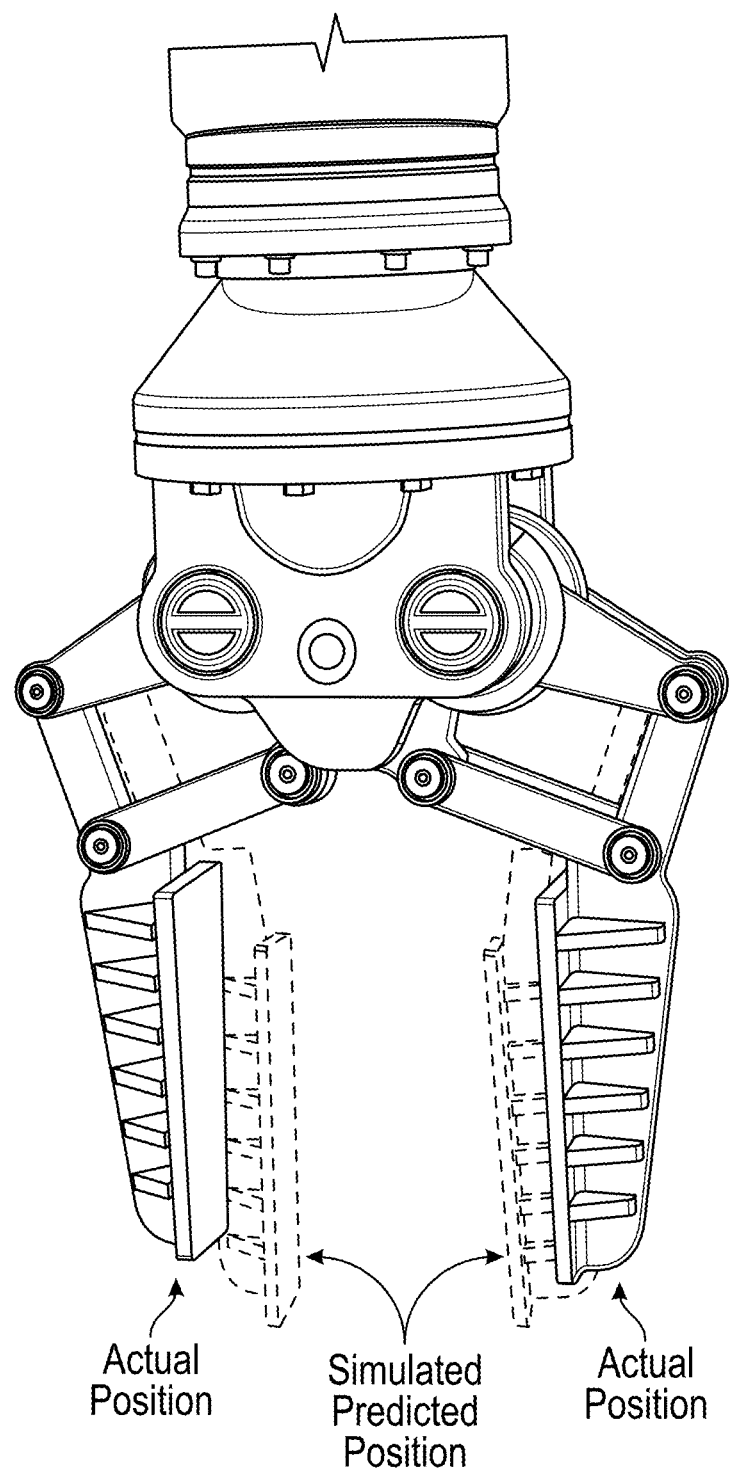
FIG. 9B illustrates one embodiment of a display showing an overlay for tool localization.

FIG. 9B illustrates one embodiment of a display showing an overlay for tool localization. As can be seen, the overlay shows the difference in the position of the simulated (or expected) position of the tool contact area, in this case a gripper, and the actual position of the tool contact area. This type of display applies to the 2D and/or 3D image overlay approaches illustrated in FIGS. 7, 8, and 9A, in one embodiment.

Figure 10:
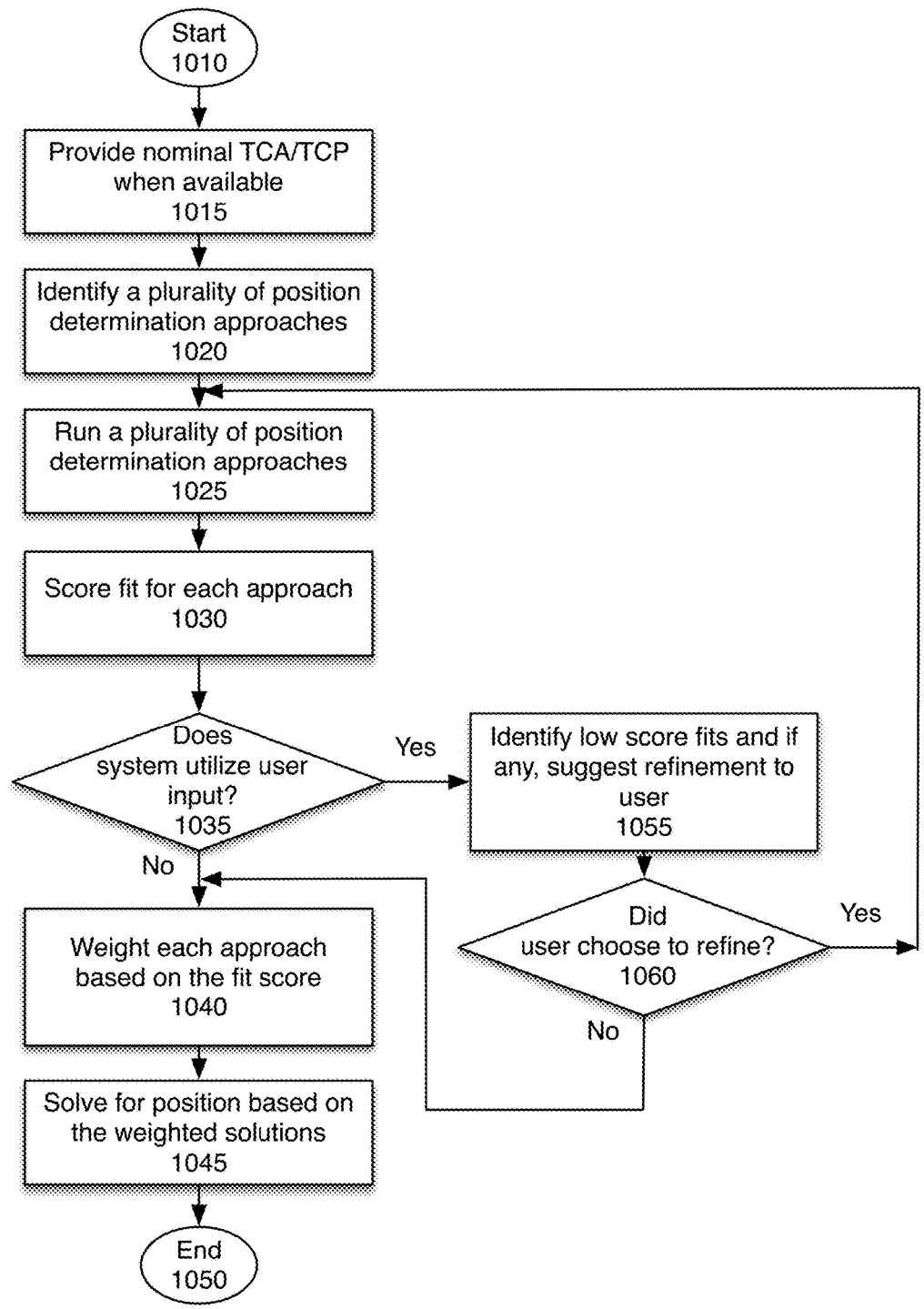
FIG. 10 is a flowchart of one embodiment of stacked tool localization approaches.

FIG. 10 is a flowchart of one embodiment of stacked tool localization approaches. In one embodiment, the different approaches described above with respect to FIGS. 4-9 may be utilized in combination. In one embodiment, the system may be capable of performing one or more of the above described TCA localization approaches. FIG. 10 illustrates a system in which two or more approaches are used in combination. This is an optional approach and need not be enabled. This process, in one embodiment, is initiated when the system is set up. The process starts at block 1010.

At block 1015, the nominal tool contact area (TCA) and/or tool center point (TCP) location is provided. In one embodiment, the nominal TCP/TCA area is determined based on an initial estimate of the robotic arm position. In one embodiment, the digital or virtual representation is used to provide the initial best guess TCA location. In another embodiment, the system may start with nothing, and obtain one or more images of the work area to approximately localize the robot arm, and thus the TCA. In another embodiment, an initial location estimate is used.

At block 1020, a plurality of position determination approaches are identified. As noted above, the position determination approaches may range from manual approaches to fully automated approaches. Four specific approaches are described with respect to FIGS. 4-9. Additional or alternative approaches may also be incorporated. In one embodiment, the selection of the position determination approach depends on the type of tool that is being evaluated. For example, for a concave tool shape, a 2D or 3D matching approach would be better than a user-selection approach. Similarly, for a tool with a lot of separate points, such as a six-fingered gripper, space carving approach would work better. On the other hand, for a push pin or other pointed tool, the user selection approach may be better.

At block 1025, a plurality of the approaches are utilized. In one embodiment, each approach is utilized "clean," that is without data from other approaches being used. In one embodiment, the approaches may be executed in parallel. In one embodiment, the same set of images are used for each approach. In another embodiment, the approaches are sequenced, and the output of one approach is available to subsequent approaches. In one embodiment, different images are used for the different approaches.

At block 1030, a fit score is calculated for each approach. A fit score, in one embodiment, is an evaluation of the consistency (and thus accuracy) of the TCA indicated by the approach. In one embodiment, the fit score may be calculated across multiple approaches. For example, the different approaches may be averaged to get an estimated position, and then the individual approaches may be evaluated with respect to that estimated position.

At block 1035, the process determines whether one or more of the approaches use user input. If so, at block 1055, the system identifies any estimates that are low score fits. If there are low score fit estimates that used user input, the user is prompted to refine the approach, or discard the approach. If the user chooses to refine, at block 1060, the process returns to block 1025, to re-run the selected estimation approaches. If the user did not choose to refine, the process continues to block 1040. In one embodiment, for approaches that are not user input based, the system may discard approaches that have low fit scores, or refine such approaches by reprocessing the data or by acquiring new images and re-applying the process with new images.

At block 1040, each approach is weighted based on the fit score. In one embodiment, the weighting may simply select the one approach that has the best fit score. In another embodiment, the system may utilize data from a combination of approaches, and when there is conflict between the approaches for any dimension (x, y, z, θ), the data from the approach with the highest score is used. Other ways of utilizing the weighted evaluations may be used.

At block 1045, the TCA location is solved based on the weighted solutions. The process then ends at block 1050.

Of course, though FIGS. 3-10 are shown as a flowcharts, in one embodiment, the order of operations is not constrained to the order illustrated, unless processes are dependent on each other. Furthermore, in one embodiment the system may be implemented as an interrupt-driven system, and thus the system does not check for the occurrence, but rather the occurrence sends a notification to trigger actions. Additionally, the various alternative implementations illustrated may be mixed and matched. For example, the vantage point selection options are discussed with respect to FIG. 9, but the same options are applicable to FIGS. 3-8.

Figure 11:
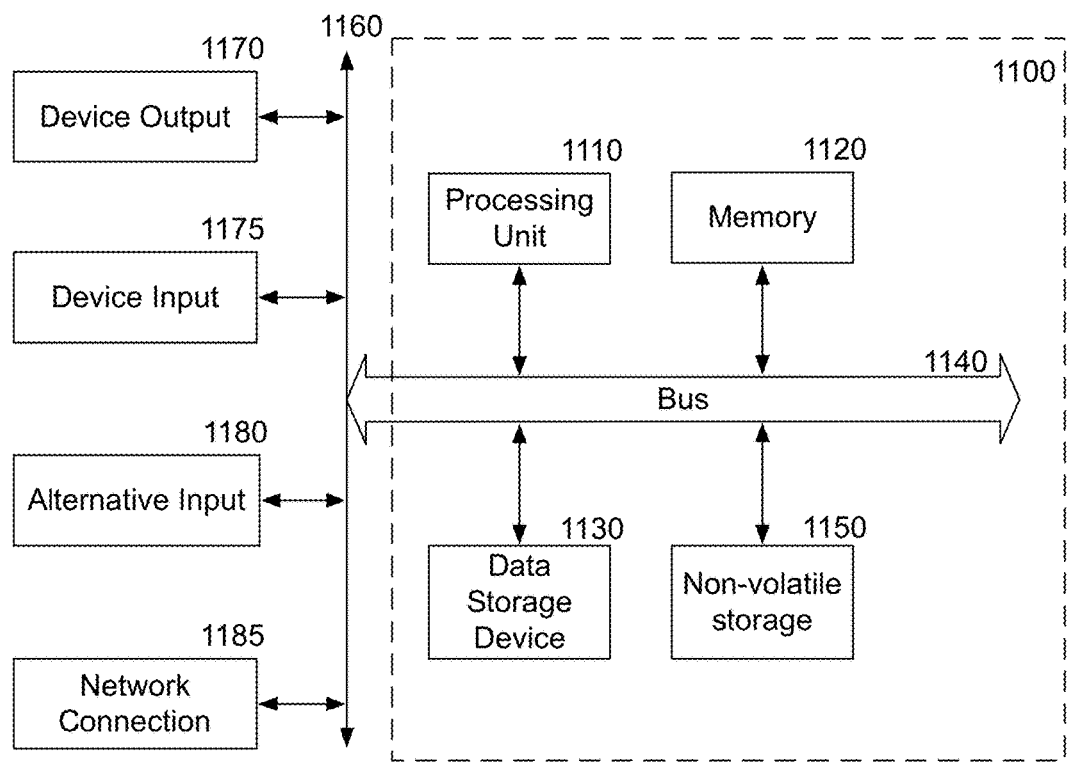
FIG. 11 is a block diagram of one embodiment of a computer system that may be used with the vision-based tool localization system.

FIG. 11 is a block diagram of one embodiment of a computer system that may be used with the vision-based tool localization system. It will be apparent to those of ordinary skill in the art, however that other alternative systems of various system architectures may also be used. In one embodiment, the computer system illustrated may be part of a robotic cell, and thus may be a special purpose computing device. In one embodiment, the computer system illustrated may be a server device.

The computer system illustrated in FIG. 11 includes a bus or other internal communication means 1140 for communicating information, and a processing unit 1110 coupled to the bus 1140 for processing information. The processing unit 1110 may be a central processing unit (CPU), a digital signal processor (DSP), graphics processor (GPU), or another type of processing unit 1110.

The system further includes, in one embodiment, a memory 1120, which may be a random access memory (RAM) or other storage device 1120, coupled to bus 1140 for storing information and instructions to be executed by processor 1110. Memory 1120 may also be used for storing temporary variables or other intermediate information during execution of instructions by processing unit 1110.

The system also comprises in one embodiment a read only memory (ROM) 1150 and/or static storage device 1150 coupled to bus 1140 for storing static information and instructions for processor 1110.

In one embodiment, the system also includes a data storage device 1130 such as a magnetic disk or optical disk and its corresponding disk drive, or Flash memory or other storage which is capable of storing data when no power is supplied to the system. Data storage device 1130 in one embodiment is coupled to bus 1140 for storing information and instructions.

In some embodiments, the system may further be coupled to an output device 1170, such as a computer screen, speaker, or other output mechanism coupled to bus 1140 through bus 1160 for outputting information. The output device 1170 may be a visual output device, an audio output device, and/or tactile output device (e.g., vibrations, etc.)

An input device 1175 may be coupled to the bus 1160. The input device 1175 may be an alphanumeric input device, such as a keyboard including alphanumeric and other keys, for enabling a user to communicate information and command selections to processing unit 1110. An additional user input device 1180 may further be included. One such user input device 1180 is cursor control device 1180, such as a mouse, a trackball, stylus, cursor direction keys, or touch screen, may be coupled to bus 1140 through bus 1160 for communicating direction information and command selections to processing unit 1110, and for controlling movement on display device 1170.

Another device, which may optionally be coupled to computer system 1100, is a network device 1185 for accessing other nodes of a distributed system via a network. The communication device 1185 may include any of a number of commercially available networking peripheral devices such as those used for coupling to an Ethernet, token ring, Internet, or wide area network, personal area network, wireless network, or other method of accessing other devices. The communication device 1185 may further be a null-modem connection, or any other mechanism that provides connectivity between the computer system 1100 and the outside world.

Note that any or all of the components of this system illustrated in FIG. 11 and associated hardware may be used in various embodiments of the present invention.

It will be appreciated by those of ordinary skill in the art that the particular machine that embodies the present system may be configured in various ways according to the particular implementation. The control logic or software implementing the present invention can be stored in main memory 1120, mass storage device 1130, or other storage medium locally or remotely accessible to processor 1110.

It will be apparent to those of ordinary skill in the art that the system, method, and process described herein can be implemented as software stored in main memory 1120 or read only memory 1150 and executed by processor 1110. This control logic or software may also be resident on an article of manufacture comprising a computer readable medium having computer readable program code embodied therein and being readable by the mass storage device 1130 and for causing the processor 1110 to operate in accordance with the methods and teachings herein.

The present invention may also be embodied in a special purpose device containing a subset of the computer hardware components described above. For example, a robotic cell may be configured to contain only the bus 1140, the processor 1110, and memory 1150 and/or 1120. The robotic cell device may be configured to include joystick or other input signaling components with which a user may select from a set of available options. These could be considered input device #1 1175 or input device #2 1180. The robotic cell device may also be configured to include an output device 1170 such as a liquid crystal display (LCD) or display element matrix for displaying information to a user of the handheld device. The implementation of the described systems and processes for such a device would be apparent to one of ordinary skill in the art given the disclosure of the present invention as provided herein.

The present invention may also be embodied in a server system, including a subset of the computer hardware components described above. The server system may be cloud based and may interface with a robotic cell via a network. For example, the server system may include a processing unit 1110, a data storage device 1130, a bus 1140, and memory 1120, and no input/output mechanisms, or only rudimentary communications mechanisms. In general, the more special-purpose the device is, the fewer of the elements need be present for the device to function. In some devices, communications with the user may be through a separate device. In one embodiment, the device may not provide any direct input/output signal but may be configured and accessed through a website or other network-based connection through network device 1185.

It will be appreciated by those of ordinary skill in the art that any configuration of the particular machine implemented as the computer system may be used according to the particular implementation. The control logic or software implementing the present invention can be stored on a machine-readable medium locally or remotely accessible to processor 1110. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g., carrier waves, infrared signals, digital signals, etc.).

Furthermore, the present system may be implemented on a distributed computing system, in one embodiment. In a distributed computing system, the processing may take place on one or more remote computer systems from the location of an operator. The system may provide local processing using a computer system 1100, and further utilize one or more remote systems for storage and/or processing. In one embodiment, the present system may further utilize distributed computers. In one embodiment, the computer system 1100 may represent a client and/or server computer on which software is executed. Other configurations of the processing system executing the processes described herein may be utilized without departing from the scope of the disclosure.

In the foregoing specification, a system for a visual tool contact area localization system and method has been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative rather than a restrictive sense.

We claim:

1. A method for vision-based tool localization (VTL) in a robotic assembly system including one or more calibrated sensors and a robot arm holding a tool, the method comprising:
    capturing a plurality of images of a tool contact area of the tool from a plurality of different vantage points;
    evaluating a first vantage point of the plurality of different vantage points by:
        rendering an outline of the tool contact area based on an estimated position of the tool;
        overlaying the outline over an image from the first vantage point of the tool contact area; and
        minimizing a distance between the rendered outline and the image;
    determining an estimated position of the tool contact area with respect to the robot arm based on the evaluating;
    refining the estimated position of the tool contact area based on a second evaluation from a second vantage point of the plurality of different vantage points; and
    providing the refined position of the tool contact area with respect to the robot arm to the robotic assembly system to enable accurate control of the tool by the robotic assembly system.

2. The method of claim 1, further comprising:
    identifying a tool center point; and
    when the tool center point is not the tool contact area, calculating the tool center point.

3. The method of claim 1, further comprising:
    utilizing a second approach for identifying the tool contact area, wherein the second approach comprises one of:
    requesting user input to select the tool contact area; and
    space carving.

4. The method of claim 1, wherein the plurality of images are taken by a plurality of cameras, and the tool contact area does not move.

5. The method of claim 1, wherein the plurality of images are taken by one camera, and the tool contact area is moved between the images being taken.

6. The method of claim 1, further comprising:
    computing an offset between the estimated position and the refined position.

7. The method of claim 1 wherein the outline is a two-dimensional outline.

8. The method of claim 1, wherein the outline is a three-dimensional outline.

9. The method of claim 1, further comprising:
    rendering a two-dimensional outline based on the estimated position; and
    refining a three-dimensional shape position based on the two-dimensional outline.

10. A method for vision-based tool localization (VTL) in a robotic assembly system including one or more calibrated sensors and a robotic arm holding a tool, the method comprising:
    capturing a plurality of images of a tool contact area of the tool from a plurality of different vantage points;
    determining an estimated position of the tool contact area based on user input, indicating a position of the tool contact area;
    refining the estimated position of the tool contact area based on another determination from another vantage point; and
    providing the refined position of the tool contact area with respect to the robotic arm to the robotic assembly system to enable accurate control of the tool by the robotic assembly system.

11. The method of claim 10, further comprising:
    prompting user to make a selection by clicking on a designated point on the tool contact area;
    identifying coordinates from the click; and
    utilizing the coordinates from a plurality of clicks to compute the refined position of the tool contact area.

12. The method of claim 11, further comprising:
providing helper data based on prior selections to the user.

13. The method of claim 11, further comprising:
zooming in toward the tool contact area, prior to prompting the user to make the selection.

14. The method of claim 11, further comprising:
mapping a sight line from a camera to the designated point; and
utilizing a plurality of sight lines to identify the refined position of the tool contact area.

15. A method for vision-based tool localization (VTL) in a robotic assembly system including one or more calibrated sensors, the method comprising:
capturing a plurality of images of a tool contact area of a tool on a robot arm from a plurality of different vantage points;
selecting a plurality of approaches to determine a tool contact area location;
determining an estimated position of the tool contact area using a first approach, wherein the first approach comprises one of: user selection, image overlay, and space carving;
refining the estimated position of the tool contact area with respect to the robot arm holding the tool based on a second approach, comprising a different one of: user selection, image overlay, and space carving; and
providing the refined position of the tool contact area with respect to the robot arm to the robotic assembly system to enable accurate control of the tool by the robotic assembly system.

16. The method of claim 15, wherein the user selection comprises:
prompting a user to make a selection by clicking on a designated point on the tool contact area;
identifying coordinates from the click; and
utilizing the coordinates from a plurality of clicks to compute the tool contact area location.

17. The method of claim 15, wherein the space carving comprises:
wherein determining the estimated position of the tool contact area comprises carving out empty space that is not the tool contact area; and
wherein refining the estimated position comprises carving out the empty space that is not the tool contact area from an image with a different vantage point.

18. The method of claim 15, wherein determining the estimated position comprises:
rendering an outline based on an estimated position of the tool contact area;
overlaying the outline over an image of the tool contact area; and
minimizing a distance between the rendered outline and the image.

19. The method of claim 15, further comprising:
weighting an accuracy for each of the plurality of approaches; and
utilizing the accuracy-weighted approaches to solve for the refined position.

20. The method of claim 19, further comprising:
identifying one of the plurality of approaches with an accuracy rating below a threshold; and
suggesting that a user re-run the identified approach.

* * * * *